No. 831,955. PATENTED SEPT. 25, 1906.
F. E. JOHNSTON & F. A. SNIDEMAN.
VEHICLE WHEEL.
APPLICATION FILED MAY 25, 1905.

Witnesses
A. D. Hendricks.
J. A. Vermilya.

Inventors
Frank E. Johnston and
Frank A. Snideman,
by Jas. H. Vermilya Attorney

UNITED STATES PATENT OFFICE.

FRANK E. JOHNSTON AND FRANK A. SNIDEMAN, OF SOUTH HAVEN, MICHIGAN.

VEHICLE-WHEEL.

No. 831,955.  Specification of Letters Patent.  Patented Sept. 25, 1906.

Application filed May 25, 1905. Serial No. 262,235.

*To all whom it may concern:*

Be it known that we, FRANK E. JOHNSTON and FRANK A. SNIDEMAN, of South Haven, county of Van Buren, State of Michigan, have invented a new and useful Improvement in Vehicle-Wheels, of which the following is a full, clear, and exact description, reference being had to the accompanying drawings, making part of this specification.

Our invention relates to improvements in wheels for vehicles; and it consists in the peculiar construction and combination of devices hereinafter described and claimed.

The object of our invention is to provide an improved wheel having an elastic periphery which is exceedingly strong and durable and is not liable to be injured.

Figure 1:
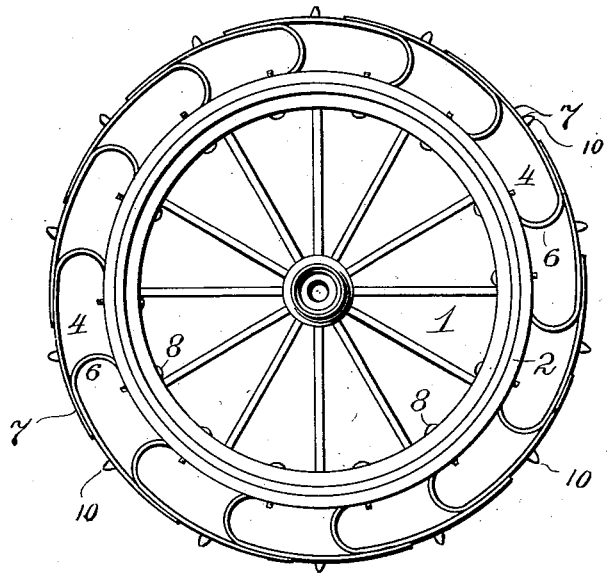
Figure 2:
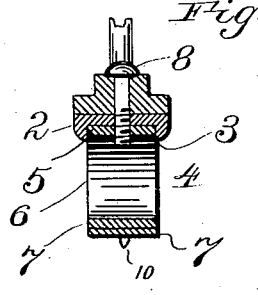
Figure 3:
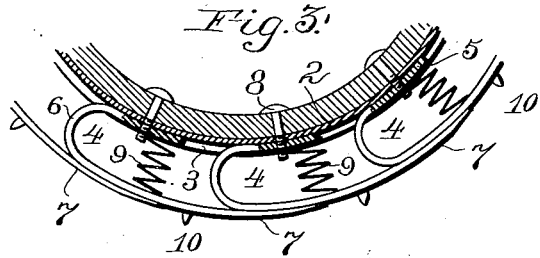

In the accompanying drawings, Figure 1 is a side elevation of a vehicle-wheel embodying our improvements. Fig. 2 is a detail transverse sectional view of the same. Fig. 3 is a detail elevation showing a modification.

The wheel 1 may be of any suitable size and construction and may be made of any suitable material. It has a rim 2, provided with a peripheral groove 3. Around the rim of the wheel are placed springs 4, each of which is substantially U-shaped, having the relatively short arm 5, the semicircular bent portion 6, and the relatively long outer arm 7. The shorter arms of the springs are placed in the groove of the rim and secured to the rim by means of bolts 8. The arms of the several springs all extend in the same direction, and the outer longer arm of each spring bears on and overlaps the longer arm of the next adjacent spring, as shown. Hence each spring is reinforced by the next adjacent spring.

The springs coact to provide the wheel with an elastic periphery, so that a vehicle provided with our improved wheels will run very smoothly and easily, and it will be understood that the springs are exceedingly strong and durable, are comparatively inexpensive, and are not likely to be injured. If desired, each of the springs can have its outer longer arm reinforced by a coil of other suitably-constructed spring 9, as shown at Fig. 3. The wheel is shown as provided with spurs 10, secured to the longer arms of the U-shaped springs to adapt the wheel for use as a traction-wheel.

Having thus described our invention, we claim—

1. A wheel of the class described having U-shaped springs secured on its periphery, each having its outer arm longer than its inner arm, bearing upon and partly overlapping the longer arm of the next adjacent spring and provided with an outwardly-extending spur.

2. A wheel of the class described having U-shaped springs secured on its periphery, each having its outer arm longer than its inner arm, bearing upon and partly overlapping the longer arm of the next adjacent spring, said longer arms coacting to form the tread of the wheel, and reinforcing-springs between the inner and outer arms of the first-mentioned springs.

In testimony whereof we have set our hands, this 4th day of May, A. D. 1905, in the presence of two attesting witnesses.

FRANK E. JOHNSTON.
    FRANK A. SNIDEMAN.

Witnesses:
 W. G. BESSEY,
 W. W. HOLMES.